(12) United States Patent
Levi et al.

(10) Patent No.: US 6,842,991 B2
(45) Date of Patent: Jan. 18, 2005

(54) GYRO AIDED MAGNETIC COMPASS

(76) Inventors: Robert W. Levi, 1616 S. Easy Way, Anaheim, CA (US) 92804; Robert R. Marshall, 588 N. Silver Fox Ct., Walnut, CA (US) 91789

( * ) Notice: Subject to any disclaimer, the term of this patent is extended or adjusted under 35 U.S.C. 154(b) by 0 days.

(21) Appl. No.: 10/618,549

(22) Filed: Jul. 11, 2003

(65) Prior Publication Data

US 2004/0020064 A1 Feb. 5, 2004

Related U.S. Application Data

(60) Provisional application No. 60/399,891, filed on Jul. 31, 2002.

(51) Int. Cl.[7] .............................................. G01C 17/38
(52) U.S. Cl. ............................ 33/356; 33/316; 33/324; 33/355 R
(58) Field of Search ...................... 33/356, 316, 317 R, 33/317 D, 318, 319, 324, 326, 355 R, 304, 313

(56) References Cited

U.S. PATENT DOCUMENTS

| | | |
|---|---|---|
| 2,091,964 A | 9/1937 | Carter |
| 3,583,074 A | 6/1971 | Baker et al. |
| 3,744,312 A * | 7/1973 | Anderson ................. 73/178 R |
| 4,031,630 A | 6/1977 | Fowler |
| 4,143,467 A | 3/1979 | Erspamer et al. |
| 4,347,730 A | 9/1982 | Fisher et al. |
| 4,611,293 A | 9/1986 | Hatch et al. |
| 4,622,646 A | 11/1986 | Waller et al. |
| 4,656,750 A | 4/1987 | Pitt et al. |
| 4,809,007 A | 2/1989 | Hassenplug |
| 4,831,563 A * | 5/1989 | Ando et al. .................... 702/93 |
| 4,851,775 A | 7/1989 | Kim et al. |
| 4,887,081 A | 12/1989 | Iihoshi et al. |
| 4,890,233 A * | 12/1989 | Ando et al. ................. 701/224 |
| 4,991,126 A | 2/1991 | Reiter |

(List continued on next page.)

OTHER PUBLICATIONS

Ladetto, Quentin et al., "Combining Gyroscopes, Magnetic Compass and GPS for Pedestrian Navigation", date unknown, Geodetic Engineering Laboratory, Institute on Geomatics, Swiss Institute of Technology, 8 pg., no date.

Ladetto, Quentin, "On Foot Navigation: Continuous Step Calibrations Using Both Complementary Recusive Prediction and Adaptive Kalman Filtering", date unknown, Geodetic Laboratory, Institute of Geomatics, Swiss Federal Institute of Technology, 6 pg., no date.

Gabaglio, Vincent et al.., "Real–Time Calibration of LEngth of Steps with GPS and Accelerometers", Swiss Federal Institute of Technology, Geodetic Engineering Laboratory, 6 pg, no date.

Ladetto, Quentin et al., "Digital Magnetic Compass and Gyroscope Integration for Pedestrian Navigation", Faculta ENAC, Institut du Developpment Territorial, Geodetic Laboratory, 10 pg., no date.

*Primary Examiner*—Diego Gutierrez
*Assistant Examiner*—Travis Reis (57) ABSTRACT

An improved method, system, and device for a compass combining an electronic magnetic compass and an angular velocity sensing gyroscope. One aspect of the invention integrates an angular velocity output signal from an angular velocity sensor or rate gyroscope to determine the angle of motion. An initial magnetic heading is obtained from a geomagnetic sensor and used as a reference for the integrated angular velocity signal. A geomagnetic heading signal is blended with the angular velocity output signal at an adaptive time interval. The adaptive time interval is increased if the reliability of the magnetic field improves and decreased if the reliability of the magnetic field degenerates. Additionally, dynamic calibration of the angular velocity sensor may be performed to correct for gyroscope bias (zero offset), and/or gyroscope scale factor or gain.

20 Claims, 5 Drawing Sheets

U.S. PATENT DOCUMENTS

| | | |
|---|---|---|
| 5,067,083 A | 11/1991 | Nakayama et al. |
| 5,115,238 A | 5/1992 | Shimizu et al. |
| 5,122,960 A | 6/1992 | Ooka |
| 5,151,862 A * | 9/1992 | Nakayama et al. .......... 701/221 |
| 5,170,354 A * | 12/1992 | Ueno et al. .................. 701/207 |
| 5,235,514 A | 8/1993 | Matsuzaki |
| 5,239,264 A | 8/1993 | Hawks |
| 5,251,139 A * | 10/1993 | Takano et al. ............... 701/221 |
| 5,287,295 A | 2/1994 | Ives et al. |
| 5,287,297 A | 2/1994 | Ihara et al. |
| 5,287,628 A | 2/1994 | Yamaguchi et al. |
| 5,297,050 A | 3/1994 | Ichimura et al. |
| 5,319,561 A | 6/1994 | Matsuzaki |
| 5,327,348 A * | 7/1994 | Kato .......................... 701/207 |
| 5,331,563 A | 7/1994 | Masumoto et al. |
| 5,349,529 A * | 9/1994 | Masumoto et al. ............ 702/85 |
| 5,404,307 A | 4/1995 | Odagawa |
| 5,424,953 A | 6/1995 | Masumoto et al. |
| 5,428,902 A | 7/1995 | Cheah |
| 5,440,484 A * | 8/1995 | Kao ........................... 701/207 |
| 5,488,788 A | 2/1996 | Durbin |
| 5,583,776 A | 12/1996 | Levi et al. |
| 5,935,191 A | 8/1999 | Sakanashi et al. |
| 5,956,660 A | 9/1999 | Neumann |
| 5,986,583 A | 11/1999 | Nakano et al. |
| 6,018,705 A | 1/2000 | Gaudet et al. |
| 6,032,099 A | 2/2000 | Fernandez |
| 6,052,654 A | 4/2000 | Gaudet et al. |
| 6,067,046 A | 5/2000 | Nichols |
| 6,081,230 A | 6/2000 | Hoshino et al. |
| 6,122,960 A | 9/2000 | Hutchings et al. |
| 6,132,391 A | 10/2000 | Onari et al. |
| 6,145,389 A | 11/2000 | Ebeling et al. |
| 6,175,608 B1 | 1/2001 | Pyles et al. |
| 6,204,807 B1 | 3/2001 | Odagiri et al. |
| 6,243,660 B1 | 6/2001 | Hsu et al. |
| 6,282,496 B1 | 8/2001 | Chowdhary |
| 6,298,314 B1 | 10/2001 | Blackadar et al. |
| 6,301,964 B1 | 10/2001 | Fyfe et al. |
| 6,305,221 B1 | 10/2001 | Hutchings |
| 6,366,855 B1 | 4/2002 | Reilly et al. |
| 6,408,251 B1 | 6/2002 | Azuma |
| 6,415,223 B1 | 7/2002 | Lin et al. |
| 6,466,871 B1 * | 10/2002 | Reisman et al. ............. 701/224 |
| 6,513,381 B2 | 2/2003 | Fyfe et al. |
| 6,522,266 B1 | 2/2003 | Soehren et al. |
| 6,546,336 B1 | 4/2003 | Matsuoka et al. |
| 2001/0042314 A1 * | 11/2001 | Kato ........................... 33/356 |
| 2001/0045128 A1 | 11/2001 | McCall et al. |
| 2002/0040601 A1 | 4/2002 | Fyfe et al. |
| 2002/0089425 A1 | 7/2002 | Kubo et al. |
| 2002/0091482 A1 | 7/2002 | Eakle, Jr. et al. |
| 2002/0111717 A1 | 8/2002 | Scherzinger et al. |
| 2002/0128775 A1 | 9/2002 | Brodie et al. |
| 2002/0143491 A1 | 10/2002 | Scherzinger |
| 2003/0018430 A1 | 1/2003 | Ladetto et al. |

\* cited by examiner

GYRO AIDED MAGNETIC COMPASS

CROSS REFERENCE TO RELATED APPLICATIONS

This non-provisional United States (U.S.) patent application claims the benefit of U.S. Provisional Application No. 60/399,891 filed on Jul. 31, 2002 by inventors Robert W. Levi and Robert R. Marshall, titled "Gyro Aided Magnetic Compass."

STATEMENT REGARDING FEDERALLY SPONSORED RESEARCH OR DEVELOPMENT

This invention was originated as part of a Federally sponsored Small Business Innovation Research (SBIR) project, contract number DAMD17-99-C-9028. The contractor is Point Research Corporation, 17150 Newhope Street, Suite 709, Fountain Valley, Calif. 92708. Patent rights for this invention are subject to the Federal Acquisition Regulations (FAR) paragraph 52.227-20—Rights in Data—Small Business Innovation Research Program, and DFARS 252.227-7018 Rights in Noncommercial Technical Data and Computer Software—Small Business Innovation Research.

FIELD

Various embodiments of the invention pertain to navigation systems. More particularly, at least one embodiment of the invention relates to a miniature navigation device, method, and system for personnel on foot, land vehicle navigation, marine navigation, and aircraft navigation.

DESCRIPTION OF RELATED ART

Magnetic compasses are commonly used to determine direction and/or the direction in which a person or vehicle is heading. However, magnetic compasses are subject to errors from nearby magnetic influences, which disturb the magnetic field of the earth. There are other less well known sources of error, such as accelerations due to motion. Some of these errors experienced on vehicles, such as northerly turning error, have been understood and described in literature for some time. Accelerations experienced by a compass worn by a person while walking or running can also cause significant errors.

The gyroscope and the magnetic compass have been used together in aircraft applications for some time, but the integration of the two data sources is typically done using the judgment of the human pilot. Recent developments in the field of micro-machined electromechanical systems (MEMS) has led to the availability of small, low-power consumption, angular rate gyroscopes with electronic data output that can be conveniently used by a microcomputer. Electronic compasses are also available with output data compatible with a microcomputer. By using a microcontroller with the appropriate software, the data from a connected gyroscope and magnetic compass can be blended together to provide a heading azimuth that is more accurate and stable than could be obtained from either sensor separately.

MEMS angular rate gyroscopes do not measure angular displacement directly but rather the rate of angular motion. However, mathematical integration of angular rate with respect to time produces a relative angular displacement or azimuth. Errors in the mathematical integration accumulate with time due to quantization effects, scale factor and bias changes, and other error sources in the signal output of the gyro. To establish azimuth directions with respect to an earth-referenced coordinate system for navigation, it is necessary to reference the angular displacement to some other source of direction information.

A magnetic compass provides absolute heading information directly without respect to a time history of motion. The output of an angular rate sensor can be numerically integrated to produce a heading angle. Although it can track changes in heading reliably in the short term, a typical angular rate sensor cannot produce an absolute heading.

DETAILED DESCRIPTION

In the following description numerous specific details are set forth in order to provide a thorough understanding of the invention. However, one skilled in the art would recognize that the invention may be practiced without these specific details. In other instances, well known methods, procedures, and/or components have not been described in detail so as not to unnecessarily obscure aspects of the invention.

In the following description, certain terminology is used to describe certain features of one or more embodiments of the invention. For instance, the terms "angular rate sensor", "angular velocity sensor", "gyroscope", "gyro", and "gyroscopic sensor" are interchangeably used to refer to a device that senses angular velocity or rate of turn and provides a corresponding signal. The terms "heading" and "azimuth" are interchangeably used to refer to a fixed direction. The terms "blend", i.e., signal blending, and "filtering" refer to any process used to combine two or more analog and/or digital signals, either in a weighted or un-weighted scheme and/or algorithm.

One aspect of an embodiment of the present invention provides a device, system, and method for creating two azimuth angle data parameters, one from a magnetic compass and another from the integration of the output of an angular rate sensor. The two azimuth angles are combined by a novel method which exploits the strengths of each heading source to overcome the weaknesses of the other.

Another aspect of an embodiment of the invention also includes a device, system, and method for performing automatic calibration of the angular rate sensor to improve performance of the combined system.

Figure 1:
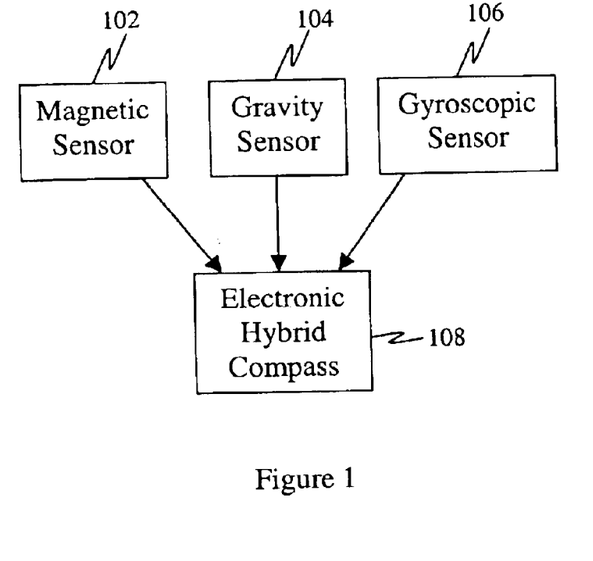
FIG. 1 is a block diagram illustrating a hybrid compass with a magnetic compass, a gravity sensor, and a gyroscopic sensor according to one embodiment of an aspect of the invention.

FIG. 1 is a block diagram illustrating an electronic compass with a magnetic sensor 102, a gravity sensor 104, and a gyroscopic sensor 106 according to one embodiment of one or more aspects of the invention. Such an electronic compass may include magnetometers 102 to measure the earth's magnetic field and gravity sensors 104 to determine the horizontal plane of the compass. The electronic compass also includes an angular rate-sensing gyroscope 106 whose sensitive axis coincides with the azimuth-sensing axis of the compass.

Figure 2:
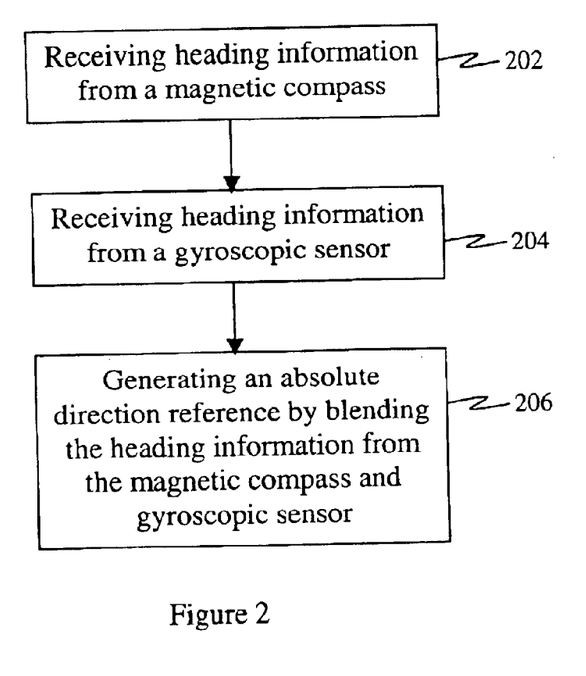
FIG. 2 is a block diagram illustrating a hybrid method for determining heading direction according one embodiment of an aspect of the invention.

FIG. 2 is a block diagram illustrating a hybrid method for determining heading direction according one embodiment of an aspect of the invention. Heading data or information is obtained, for example, from a magnetic compass 202 and a gyroscopic sensor 204. The heading information provided by the magnetic compass is blended, or filtered, with the integrated angular rate data, from the gyroscopic sensor, over time to provide an absolute reference heading 206. The overall accuracy of this hybrid heading is assured by blending in the directional information from the magnetic compass faster than errors from the gyroscopic angular rate sensor can accumulate.

Figure 3:
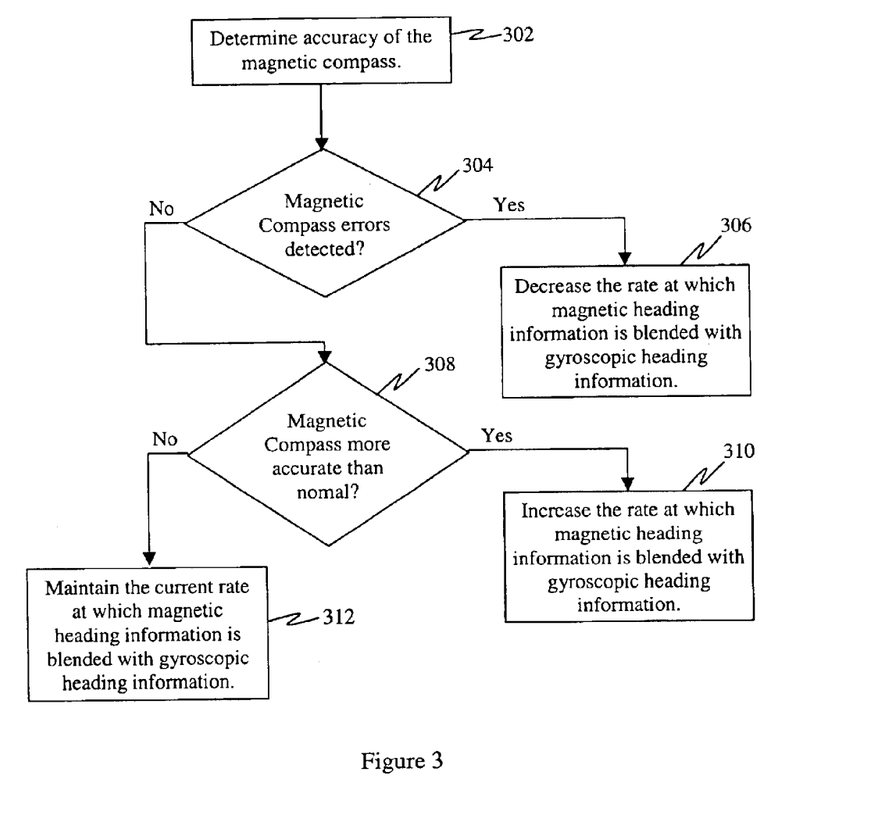
FIG. 3 is a block diagram illustrating a method for varying the rate at which the magnetic heading is blended with the gyroscopic heading according one embodiment of an aspect of the invention.

FIG. 3 is a block diagram illustrating a method for varying the rate at which the magnetic heading is blended with the gyroscopic heading according one embodiment of an aspect of the invention. Upon determining the accuracy of the magnetic compass 302, the blending rate may be made slower 306 when magnetic compass errors are evident 304. Otherwise, maintain the current blending rate at which magnetic heading information is blended with gyroscopic heading information 308. If the blending rate has been previously reduced, a default blending rate may be restored 308. Such operation provides for an adaptive time interval or blending rate to improve the accuracy of a hybrid electronic compass depending on the reliability of the heading information collected from different sources.

Various methods may be used for deducing that magnetic heading errors are present. For example, variations in the three-dimensional magnitude of the measured magnetic field may be used to imply a nearby magnetic influence, and/or substantial time-varying accelerations may be used to imply errors induced into the compass's tilt compensation mechanism and/or logic. If no change in the accuracy of the magnetic compass is detected, then the blending rate is maintained or the default blending rate is restored 308.

According to one embodiment of the invention, under certain circumstances, the output of the hybrid compass may be forced to the magnetic compass value instead of blending it with gyroscopic angle data. This may be done for quick corrections and/or at startup. It may also be done at any time when other information, such as GPS velocity vectors, can confirm the accuracy of the magnetic compass.

The information from a gyroscopic sensor may also be used, by itself, to generate a heading information. Once a starting orientation is provided, the angular rate data from the gyroscopic sensor may be mathematically integrated with respect to time. The resulting information may then be used as an alternative to a magnetic compass azimuth. Unfortunately, a gyroscopic sensor cannot be a substitute for a magnetic compass indefinitely since it suffers from zero offset, scale factor errors and other low-frequency noise which integrate into significant errors over time. The amount of time that a gyroscopic sensor can reliably operate with minimal error accumulation depends on various factors, including the quality of the gyroscope employed in a particular application.

There are two primary sources of error when using an angular rate gyro: 1) "zero offset" or bias, which is the output of the sensor when it is motionless, and 2) scale factor or gain, which is the ratio between the gyro sensor's output and the physical rotation rate. An element of the present invention involves techniques for determining and correcting both factors during the use of the invention. For this reason, the time since the last correction is monitored. As the time interval since the last correction increases, the risk of error increases and can be taken into account. An error in zero offset induces errors in azimuth that are a function of time due to the mathematical integration process. An error in gain affects azimuth accuracy only as azimuth changes, and then only the net change is affected. The influence of these errors can be estimated, in the first case (zero offset) from the elapsed time since the last correction, and, in the second case (gain) from the net change in azimuth since the last correction.

Thus, various embodiments of the present invention combine the gyroscopic sensor information and the magnetic compass data to produce an orientation signal that can replace the stand-alone compass azimuth.

Figure 4:
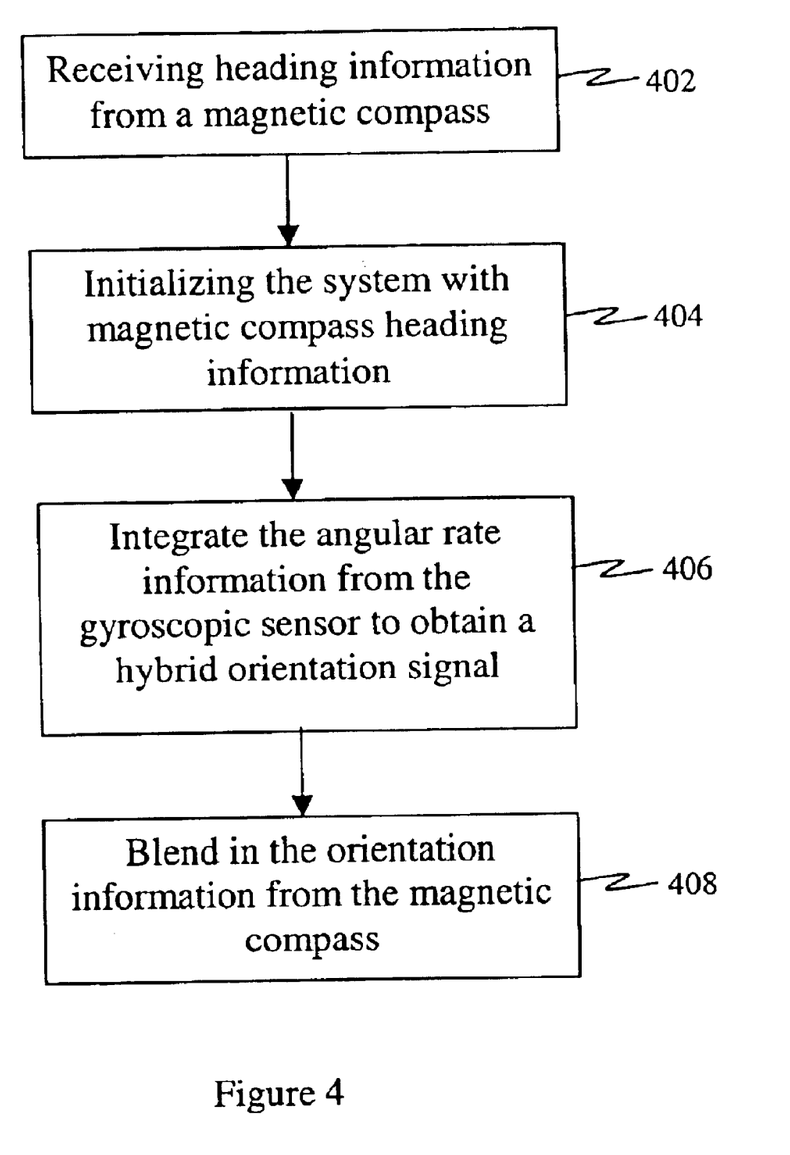
FIG. 4 is a diagram illustrating a general method for combining gyroscopic angular rate information with magnetic compass directional information to generate a hybrid directional signal according one embodiment of an aspect of the invention.

FIG. 4 is a block diagram illustrating a general method for combining gyroscopic angular rate information with magnetic compass directional information to generate a hybrid directional signal according one embodiment of an aspect of the invention. Heading information from a magnetic compass is received 402 used to provide an initial direction 404. The angular rate information from a gyroscopic sensor is integrated over time to determine the relative change in position and orientation. Together with the initial magnetic heading, the integrated angular rate information provides a hybrid directional signal 406. The directional signal may be blended with the magnetic compass signal 408, either periodically or as needed, to maintain heading accuracy.

Figure 5:
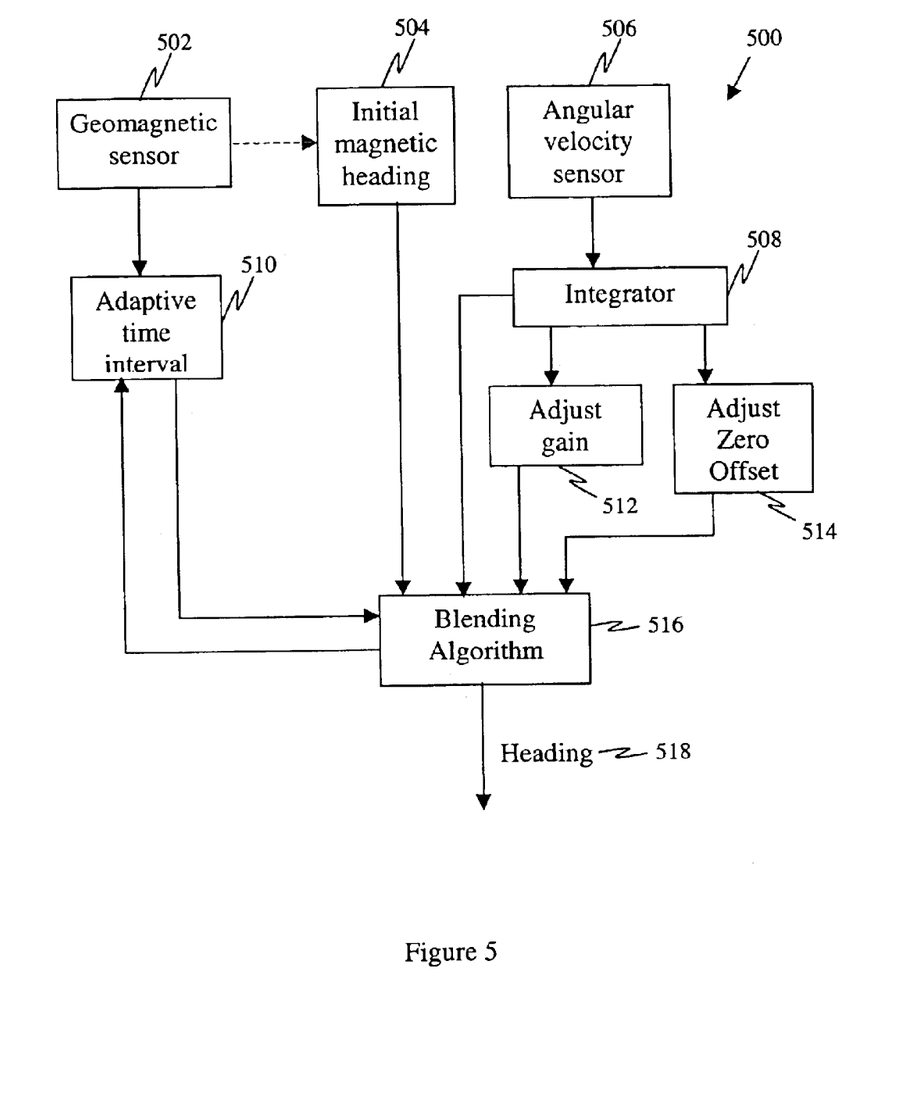
FIG. 5 is a block diagram illustrating a hybrid electronic compass according to one implementation of the invention.

FIG. 5 is a block diagram illustrating a hybrid electronic compass device 500 according to one implementation of the invention. A geomagnetic sensor 502 provides an initial magnetic heading, azimuth, or direction 504 signal that is employed as a starting reference for the system and/or algorithm 508. The output signal from an angular velocity sensor 506 is integrated over time to determine the distance and direction(s) of travel.

At some time interval, the current geomagnetic sensor's 502 directional information is blended or filtered into the hybrid directional signal through a simple filter 516. The blending filter may be implemented by calculating a fraction of the difference of the two inputs, namely the magnetic compass and integrated gyro data, and adding the difference to one of the inputs at uniform intervals to produce the blended output.

In order to maintain the accuracy of the hybrid directional signal, the magnetic directional signal may be blended or filtered faster than gyroscope errors can accumulate. For example, the restoration time constant, or blending time interval, may be approximately thirty seconds in one implementation. The extent of this blending can be varied either by changing the fraction of the difference added to the input signal or by changing the interval between the blending operations. In one implementation of the invention, a portion of the difference between compass and gyro azimuth is added to the gyro azimuth. In this manner, the gyroscope's integrated angular rate dominates short-term azimuth determination, while the magnetic compass stabilizes long-term accuracy. The amount of the difference which is added to the gyro azimuth signal during each interval can be varied, as needed, as estimates of compass and gyro accuracy dictate.

In one implementation of the invention, an adaptive restoration time interval 510 is used to blend in the geomagnetic directional signal 502 with the hybrid directional signal. The time interval 504 lengthens if the intensity of the overall magnetic field changes substantially, which may imply a significant anomaly nearby. Magnetic azimuths are derived from the horizontal components of the earth's three-dimensional magnetic field. Since magnetic sensors alone cannot distinguish between horizontal and vertical magnetic components, another set of sensors such as accelerometers, may be used to define the magnetic components in the horizontal plane, particularly when the magnetometer frame of reference is inclined or tilted. Sensing the horizontal plane and resolving the horizontal magnetic components may be termed "tilt compensation". When tilt compensation uses accelerometer sensors, blending or filtering the compass information back in with the hybrid signal is suspended entirely if accelerometer outputs approach the ratings of the devices (i.e., ±2 g) since such an overload may produce serious errors in the tilt compensation logic.

Since the usefulness of the gyroscopic sensor is strongly dependent upon accurate calibration, one implementation of the system of the present invention is capable of adjusting both gain 512 and zero offset 514 dynamically. According to various aspects of the present invention, the accuracy of the angular rate data may be improved by regular calibration of 1) the gyroscope bias, i.e., the output when there is no angular motion (zero offset), and/or 2) gyroscope scale factor or gain, i.e., the ratio between gyroscope output and the rate of rotation.

One implementation of an embodiment of the invention can estimate both of these parameters and update its calculations by taking advantage of opportunities that arise during normal use.

If the magnetic compass heading is stable then the gyroscopic sensor output can be stored at that moment to adjust the zero-offset 514. When the hybrid compass apparatus is motionless, angular rotation is, by definition, zero. The output of the sensor can be taken as the zero offset at such a time. If the output of the magnetic compass is unchanging, the rotation rate is taken to be zero as well, and this will be true even if the compass is experiencing an error due to nearby magnetic influences. This test for no rotation can be enhanced by requiring that the bandpass-filtered accelerometer outputs, used in the compass tilt compensation, also be stable or small.

When a motionless or nearly motionless state is achieved both before and after a substantial rotation, the gain of the gyroscopic angular rate sensor can be deduced by comparing before-and-after magnetic compass readings with the mathematical integral of the angular rate during the same interval. This information may be used to adjust the gyroscope gain calibration 512.

In one implementation of the invention, neither zero offset nor gain calibrations are ever changed suddenly by the system. Since dynamic calibration is susceptible to some anomalous errors, filtering is used to prevent too much influence from such anomalous events.

Thus, both the zero offset and sensor gain for the gyroscopic angular rate sensor may be modified during operation. However, there is a possibility that a newly determined value for zero offset or sensor gain could be erroneous to some extent. Consequently, one implementation of the invention employs the new calibration values, determined during operation, to modify the coefficients used during navigation calculations through filtering rather than replacing such coefficients outright. Thus, the effects of any single erroneous set of calibration values are minimized.

In some instances, dynamic calibration may be more effective for zero offset than for gain. The opportunities for zero offset measurements are more common and more dependable. This is fortunate since accurate zero offset is also more critical for calculation of accurate azimuth angle and use in navigation.

Figure 6:
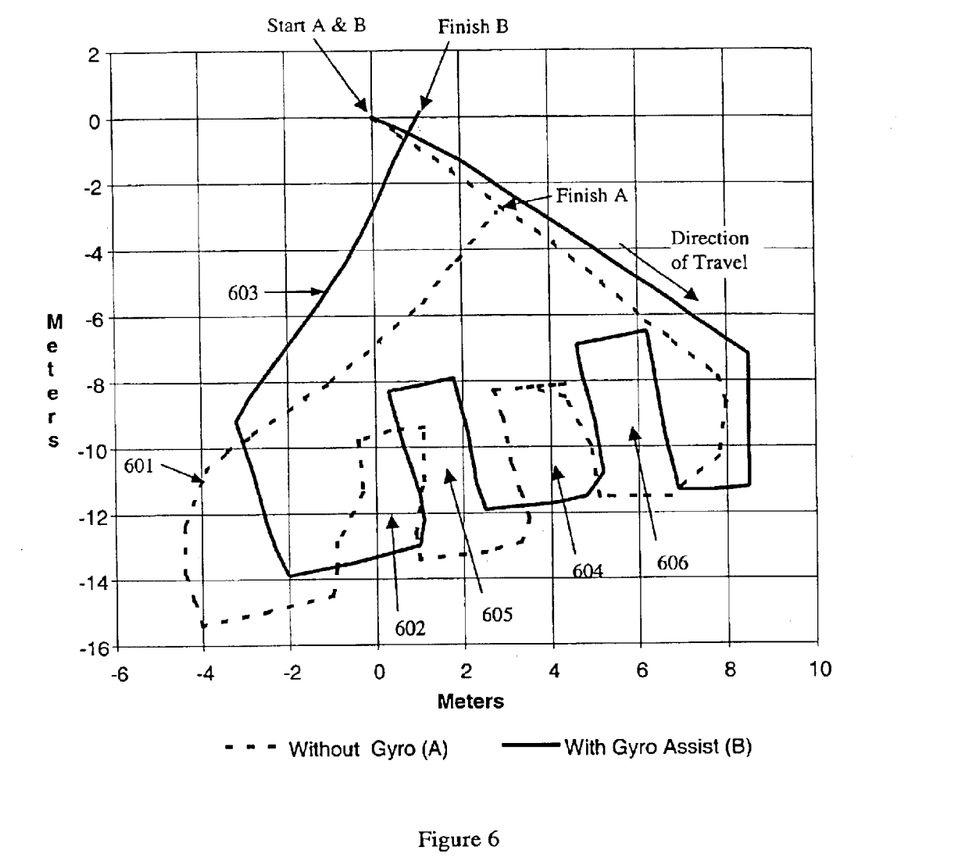
FIG. 6 is a diagram illustrating results of a navigation test for a stand-alone magnetic compass and a hybrid electronic compass according to one embodiment of the invention.

FIG. 6 is a diagram illustrating results of a navigation test for a stand-alone magnetic compass and a hybrid electronic compass according to one embodiment of the invention. This diagram shows two tracks of a short dead reckoning navigation test made largely between parked cars. One track (dashed line) indicates the path traveled as determined only by the magnetic compass. The solid line indicates the same path traveled as determined with assistance of a gyroscope according to one implementation of the invention. The route traveled ended at exactly the same point it began. So the ability to close the path and the accuracy of the orientation (azimuth determination) is easily seen. The track history shown is for a single test where the tracks for a magnetic compass device and a hybrid compass device were simultaneously recorded. By eliminating any differences in how the course was traversed, this guaranteed that the only difference between the two tracks is the influence of the angular rate sensor or gyroscope.

Substantial distortions in dead reckoning position occurred with the magnetic compass (dashed line) 601, which appeared to be caused by magnetic effects of parked cars 602 and 604. By contrast, the hybrid compass device shows a path 603 that has distinct directions, accurately determined the start and finish and position of cars 605, 606, and lacks the distortions of the magnetic compass path 601. The difference in closing error is another strong indication of the effectiveness of the gyro-aided magnetic compass.

In one implementation of the invention, the gyroscope or angular rate sensor is not used to implement strapdown inertial navigation, as in a three gyroscope—three accelerometer Inertial Measurement Unit (IMU), but is instead used for directional guidance only.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications are possible. Those skilled, in the art will appreciate that various adaptations and modifications of the just described preferred embodiment can be configured without departing from the scope and spirit of the invention. Additionally, it is possible to implement embodiments of the invention or some of their features in hardware, programmable devices, firmware, software or a combination thereof. The invention or parts of the invention may also be embodied in a processor-readable storage medium or machine-readable medium such as a magnetic (e.g., hard drive, floppy drive), optical (e.g., compact disk, digital versatile disk, etc), or semiconductor storage medium (volatile and non-volatile). Therefore, it is to be understood that, within the scope of the appended claims, the invention may be practiced other than as specifically described herein.

What is claimed is:

1. A device comprising:
   a geomagnetic sensor for sensing a heading and providing a corresponding first heading signal;

an angular velocity sensor for sensing motion and outputting a corresponding angular velocity signal;

a signal integrator communicatively coupled to the angular velocity sensor to receive the angular velocity signal and output a second heading signal; and a processing unit communicatively coupled to the geomagnetic sensor and signal integrator, the processing unit configured to receive an initial reference heading from the geomagnetic sensor, generate a hybrid heading signal based on the initial reference heading and the second heading signal, and blend the first heading signal with the hybrid heading signal at an adaptive time interval, wherein said adaptive time interval varies based upon the presence of magnetic compass errors as determined by said processing unit.

2. The device of claim 1 wherein the angular velocity signal corresponds to a relative heading.

3. The device of claim 1 wherein the adaptive time interval increases if a significant magnetic anomaly is deduced and decreases if the reliability of the magnetic sensor improves.

4. The device of claim 1 wherein the adaptive time interval at which the first signal from the geomagnetic sensor is blended with the hybrid signal depends upon indications as to whether the geomagnetic sensor is likely to be accurate.

5. The device of claim 4 changes in the overall magnitude of the earth's magnetic field are used as indications of the geomagnetic sensor's accuracy.

6. The device of claim 4 wherein changes in acceleration are used as an indication of the geomagnetic sensor's inaccuracy.

7. The device of claim 1 wherein the angular velocity sensor is calibrated by taking the output angular velocity signal as a zero offset value when the first heading signal from the geomagnetic sensor is substantially constant and the device is substantially motionless.

8. The device of claim 7 wherein the zero offset value gradually replaces a previous offset value.

9. The device of claim 1 wherein a gain value for the angular velocity sensor is calibrated by monitoring for constant readings from the geomagnetic sensor at two well-separated angles and comparing the difference between those angles and the integrated output of the angular velocity sensor.

10. The device of claim 9 wherein the gain value gradually replaces a previous gain value.

11. A method comprising:

sensing a heading of a body based on earth's magnetic field;

providing an initial heading based on the sensed heading;

sensing angular motion of the body with an angular rate sensor;

providing an angular rate signal based on the sensed angular motion;

integrating the angular rate signal to provide a second heading signal;

generating a hybrid heading signal based on the initial heading and the second heading signal;

providing a first heading signal based on the sensed heading; and blending in the first heading signal with the hybrid heading signal at an adaptive time interval, wherein said adaptive time interval varies based upon the presence of magnetic compass errors as determined by a processing unit.

12. The method of claim 11 wherein the adaptive time interval increases if a significant magnetic anomaly is deduced and decreases if the reliability of the earth's magnetic field improves.

13. The method of claim 11 further comprising:

determining a new zero offset for the angular rate sensor when the first heading signal is substantially constant during a period of substantial immobility.

14. The method of claim 13 further comprising:

calibrating the angular rate sensor by gradually replacing previous zero offsets with the new zero offset.

15. The method of claim 11 further comprising:

determining a new gain value for the angular rate sensor by monitoring for constant readings from a geomagnetic sensor at two well-separated angles and comparing the difference between those angles and the second heading signal.

16. The method of claim 15 further comprising:

calibrating the angular rate sensor by gradually replacing the previous gain value with the new gain value.

17. A gyroscope-aided compass comprising:

geomagnetic sensing means for sensing a heading and providing a corresponding first heading signal;

angular velocity sensing means for sensing motion and outputting a corresponding angular velocity signal;

signal integrating means communicatively coupled to the angular velocity sensing means to receive the angular velocity signal and output a second heading signal; and a processing means communicatively coupled to the geomagnetic sensing means and signal integrating means, the processing means configured to receive an initial reference heading from the geomagnetic sensing means, generate a hybrid heading signal based on the initial reference heading and the second heading signal, and blend the first heading signal with the hybrid heading signal at an adaptive time interval, wherein said adaptive time interval varies based upon the presence of magnetic compass errors as determined by said processing means.

18. The gyroscope-aided compass of claim 17 wherein the adaptive time interval increases if a significant magnetic anomaly is deduced and decreases if the reliability of the earth's magnetic field improves.

19. The gyroscope-aided compass of claim 17 further comprising:

calibration means for determining a new zero offset for the angular rate sensing means when the first heading signal is substantially constant during a period of substantial immobility, wherein the calibration means gradually replaces previous zero offsets with the new zero offset.

20. The gyroscope-aided compass of claim 17 further comprising:

calibration means for determining a new gain value for the angular rate sensing means by monitoring for constant readings from the geomagnetic sensing means at two well-separated angles and comparing the difference between those angles and the second heading signal.

* * * * *